United States Patent [19]
Ehlers et al.

[11] 3,953,581
[45] Apr. 27, 1976

[54] PURIFICATION OF WET-PROCESSED PHOSPHORIC ACID USING ANHYDROUS SOLVENTS

[75] Inventors: Klaus Peter Ehlers, Hurth-Knapsack; Wolfgang Scheibitz, Leverkusen; Gero Heymer, Erftstadt Liblar, all of Germany

[73] Assignee: Hoechst Aktiengesellschaft, Frankfurt am Main, Germany

[22] Filed: Apr. 24, 1974

[21] Appl. No.: 463,531

[30] Foreign Application Priority Data
Apr. 30, 1973 Germany............................ 2321751

[52] U.S. Cl............................................. 423/321 S
[51] Int. Cl.²................................................ C01B 25/16
[58] Field of Search ................ 423/321 S, 321, 320, 423/319

[56] References Cited
UNITED STATES PATENTS
1,929,442   10/1933   Milligan........................... 423/321 S
3,764,657   10/1973   Frankenfeld et al. ........... 423/321 S FOREIGN PATENTS OR APPLICATIONS
173,727      1934   Switzerland ..................... 423/321 S
1,020,071   1966   United Kingdom ............. 423/321 S
1,173,517   1969   United Kingdom ............. 423/321 S
1,209,272   1970   United Kingdom ............. 423/321 S

*Primary Examiner*—Oscar R. Vertiz
*Assistant Examiner*—Eugene T. Wheelock
*Attorney, Agent, or Firm*—Connolly and Hutz

[57] ABSTRACT

Contaminated wet-processed phosphoric acid is purified. To this end, the wet-processed phosphoric acid is mixed with one or more organic solvents, in which water is partially soluble, the organic solvent(s) is (are) separated from unabsorbed wet-processed phosphoric acid portions, and phosphoric acid is recovered from the organic solvent(s) so separated. The organic solvent(s) are more particularly used in the form of anhydrous material and at least in the quantity necessary to ensure dissolution (a) of the overall quantity of phosphoric acid contained in the wet-processed phosphoric acid and (b) of the free water therein.

15 Claims, 1 Drawing Figure

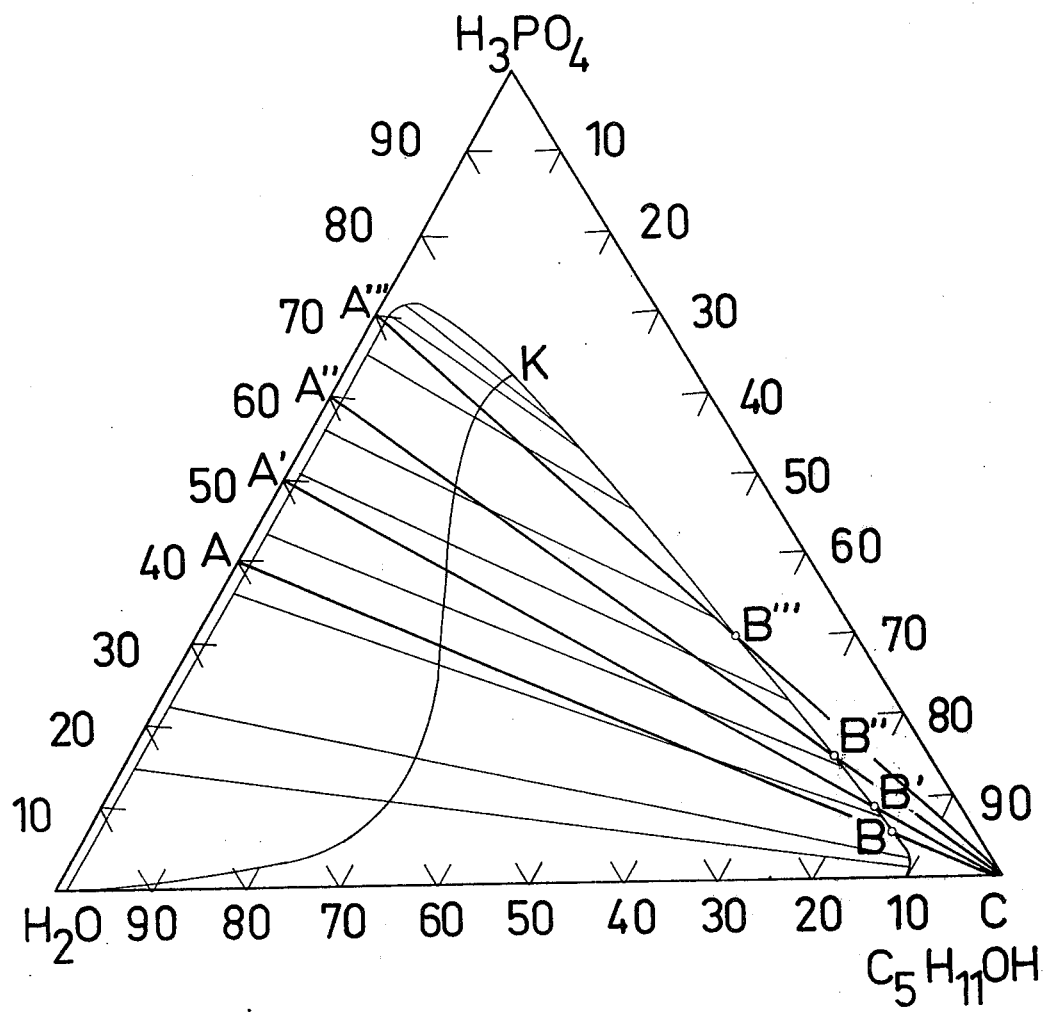

PURIFICATION OF WET-PROCESSED PHOSPHORIC ACID USING ANHYDROUS SOLVENTS

The present invention relates to the purification of contaminated wet-processed phosphoric acid, wherein the wet-processed phosphoric acid is mixed with one or more organic solvents, in which water is partially soluble and which absorb phosphoric acid, the organic solvent(s) is (are) separated from unabsorbed portions of the wet-processed phosphoric acid, and the absorbed phosphoric acid is recovered from the organic solvent(s) so separated.

Wet-processed phosphoric acids, these being acids which are obtained by subjecting phosphate ores to processing treatment with the use of mineral acids, are very difficult to purify, even to-day. Various proposals for their purification have indeed been made, but few of them have gained technical interest, in view of the serious adverse effects encountered in the prior-art procedures, which make it difficult to utilize them under commercially attractive conditions.

Organic solvents immiscible with water, and also organic solvents miscible with any quantity of water, have more particularly been tried heretofore for the extractive purification of wet-processed phosphoric acid. Owing to the low distribution coefficient of phosphoric acid, the organic solvents first referred to hereinabove are not fully satisfactory, however, as it is necessary, with a view to obtaining extraction rates as high as possible, for them to be used in quantities which ensure a high solvent/acid ratio, and for the extraction to be carried out in a plurality of steps, which is disadvantageous. In addition to this, the resulting purified acids are commonly very dilute and unsuitable for certain uses. It is actually possible for the number of individual extraction stages to be reduced by purifying only a fraction of the crude phosphoric acid (based on the overall quantity thereof) and by converting the balance portion into more strongly contaminated phosphoric acid. Even though it is possible to achieve this with relatively little expenditure in respect of equipment, it is necessary to provide for the utilization of the more strongly contaminated phosphoric acid. This has been found to handicap the utilization of this prior process considerably.

Organic solvents of unlimited miscibility with water can also be used for the extraction of phosphoric acid from the crude mixture which originates from processed crude phosphates. In this case, however, the resulting extracts are difficult to free from contaminants which are dissolved therein, and the phosphoric acid is difficult to recover from the solvent; more particularly, it is necessary for the phosphoric acid to be recovered by very expensive separation methods.

Organic solvents partially miscible with water have also been tried as phosphoric acid extractants, commonly in a form completely or partially saturated with water. German published Pat. ("Offenlegungsschrift") No. 2,127,141, for example, describes the extraction of phosphoric acid with the use of solvents saturated with water to between 40 and 50%, based on the saturation limit. Although, in this latter case, the phosphoric acid actually has a distribution coefficient greater than that which applies in the case of alcohols saturated with water, the fact remains that this does not significantly reduce the number of extraction steps necessary to obtain maximum yields, nor does it permit a reduction in the high ratio of solvent to acid which is necessary. In other words, this process cannot be considered to provide any true advantage over those methods using solvents saturated with water.

The same is true concerning the process described in German Pat. No. 884,358, wherein solvents partially miscible with water, which have different degrees of saturation with water, are used in undefined quantitative proportions. Despite the adoption of multi-stage counterflow extraction, only 83% of the free phosphoric acid is recovered. This corresponds to a total $P_2O_5$ yield of at most 75 %.

In accordance with the present invention we now provide a surprisingly simple and economical process for the purification of contaminated wet-processed phosphoric acid, wherein the wet-processed phosphoric acid is mixed with one or more organic solvents, in which water is partially soluble and which absorb phosphoric acid, the organic solvent(s) is (are) separated from unabsorbed portions of the wet-processed phosphoric acid, and the absorbed phosphoric acid is recovered from the organic solvent(s) so separated, which process comprises salting out the contaminants present in the wet-processed phosphoric acid by using the organic solvent(s) in the form of anhydrous material and in a quantity which is at least equal to the quantity necessary to ensure dissolution (a) of the total quantity of phosphoric acid contained in the wet-processed phosphoric acid and (b) of the free water (that is to say, the water which is not chemically combined with or in any other substance) which is present therein.

The organic solvent(s) should preferably be used in a quantity exceeding the minimum quantity by 10 to 15 weight%. To recover the phosphoric acid (this being phosphoric acid which is present in the form of one or more phosphates) from crude wet-processed phosphoric acid, it is good practice to add a mineral acid to the mixture comprising the organic solvent(s) and wet-processed phosphoric acid. The mineral acids which may be used include sulfuric acid, nitric acid and hydrochloric acid, for example. The mineral acid should preferably be used in a proportion of up to 40 parts by weight, and more preferably in a proportion between 5 and 15 parts by weight, per 100 parts by weight of $P_2O_5$.

Particularly useful organic solvents are $C_5$ alcohols, preference being given to the use of a $C_5$ alcohol mixture obtained by OXO reaction. The purification is preferably effected at temperatures between 0° and 130°C, and more preferably between 20° and 80°C. Following this, the organic solution (i.e., the organic solvent together with the phosphoric acid and free water dissolved therein) can be separated from residual matter and can be scrubbed with water or with a phosphoric acid being in equilibrium with the organic solution. It is sufficient for the solvent to be scrubbed with the scrubbing liquid (i.e., water or a phosphoric acid as just mentioned) in a ratio by volume of 10:1 to 100:1. The organic solution is preferably scrubbed in a countercurrent operation. The organic solution obtained may be treated with water, preferably with water flowing countercurrently with respect thereto, to recover phosphoric acid therefrom. The solution may thus be separated into solvent free from phosphoric acid, and into pure phosphoric acid.

A further method of separating the phosphoric acid from the solution which may be employed comprises neutralizing the organic solution, preferably by means of one or more of the hydroxides and carbonates of the alkali metals and ammonium, and recovering the phosphoric acid contained therein in the form of one or more phosphates. The present process has proved so effective that it is possible for the purification to be carried out as a single-step or two-step operation.

The present invention compares favorably with prior art methods in respect of the following points:

1. The purification can be effected in a single-step or two-step countercurrent operation.

2. $P_2O_5$ can be produced in a single-step operation in yields between 92 and 98 %, depending on the nature of the crude acid used.

3. The process is substantially unaffected by the concentration of the feed acid.

4. Relatively highly concentrated purified acids can be produced.

5. Only minor amounts of alcohol need be dehydrated by distillation.

6. The process avoids complicated filtration steps.

7. A single liquid phase is produced, the wet-processed phosphoric acid contaminants being obtained in the form of more or less solid material, which is easy to separate from the organic solution.

8. The organic solution is relatively pure and only minor quantities of liquid are needed for scrubbing it.

The use of the process of the present invention will now be described with reference to the accompanying drawing, the single FIGURE of which is a phase diagram for three components comprising phosphoric acid, water and a solvent which is partially miscible with water. Even though the phase diagram has been prepared for pure phosphoric acid and amyl alcohol, it is substantially equally applicable to impure phosphoric acid and in principle applicable to solvents other than amyl alcohol. In the phase diagram, the letter K denotes the critical phase separation point. In clear contrast with prior-art methods wherein use is made of amyl alcohol or another solvent which is partially miscible with water, the extraction in accordance with the present invention has been found to occur exclusively within the region of complete miscibility of the three components with each other, which lies between the $H_3PO_4$—$C_5H_{11}OH$ two-component axis and the binode curve. As a result, it is possible for free phosphoric acid and free water present in the crude phosphoric acid to be completely dissolved in the organic solvent, and for cationic contaminants to be precipitated separately in the form of more or less solid phosphates, sulfates and fluorides, which are very easy to separate from the organic solution. This is in clear contrast with prior-art methods, in which these solvents inevitably produce a second liquid phase having residual phosphoric acid fractions therein which have been extracted therefrom with heavy expenditure in respect of equipment. To avoid this, it is necessary in accordance with the present invention to provide for the use of a certain minimum quantity of solvent, which depends on the concentration of the wet-processed phosphoric acid to be extracted in each particular case, and which is graphically indicated in the accompanying phase diagram, wherein the respective points A, A', A'' and A''' lying on the $H_3PO_4$-$H_2O$ two-component axis are connected to the single component point C so as to define the ratios AB : BC, A'B' : B'C, A''B'':B''C and A'''B''' : B'''C where B, B', B'' and B''' are the points of intersection of the connecting lines AC, A'C, A''C and A'''C with the binode curve, which is the boundary line between the single phase and the two-phase areas. Only if use is made of the minimum quantitative ratios of anhydrous solvent to phosphoric acid indicated by the above ratios is it possible to ensure the complete extraction of free phosphoric acid from the crude phosphoric acid.

With respect to the crude acid, it is generally not known what quantity of free phosphoric acid, of which a portion is bound by cationic contaminants, is actually contained therein. It is therefore advisable for the solvent quantity which is to be used to be based on the analytically determined overall $P_2O_5$ content in the solution. The solvent quantity so determined will at most be 10 to 15 % higher than the quantity theoretically necessary for the extraction of the free phosphoric acid. In this manner, it can be ensured that the solvent is actually used in the necessary minimum quantity. The following Table identifies the minimum quantities of solvent (in milliliters of amyl alcohol per 100 g $P_2O_5$) which are definitely required in the treatment of phosphoric acids of different concentration.

Table

| Phosphoric acid | | Ratio by weight Alcohol:crude acid | Ratio by vol. Alcohol: crude acid | ml alcohol per 100 g of $P_2O_5$ |
|---|---|---|---|---|
| % $P_2O_5$ | % $H_3PO_4$ | | | |
| 29 | 40 | 6 : 1 | 9.2 : 1 | 2530 |
| 36.2 | 50 | 4.6 : 1 | 7.5 : 1 | 1560 |
| 43.4 | 60 | .3 : 1 | 5.4 : 1 | 871 |
| 50.7 | 70 | 1.3 : 1 | 2.5 : 1 | 323 |

A preferred feature of the process of the present invention provides for the crude acid to be admixed with up to 40 parts by weight, preferably 5 to 15 parts by weight, per 100 parts by weight of $P_2O_5$, of mineral acid, e.g., sulfuric acid, nitric acid or hydrochloric acid. In this way, the content of free phosphoric acid in the crude acid is so increased that it is possible for up to 98 % of the total quantity of $P_2O_5$ present in the crude acid to be extracted therefrom in single-step or two-step countercurrent operation, provided that the solvent is used in the necessary minimum quantity, according to the concentration of the phosphoric acid being dealt with in the particular case which is under consideration.

The fact that the extraction and dissolution steps, once they are complete, produce an alcohol saturated with water, making it possible for the process to be carried out in a pure liquid-liquid two-phase system, also deserves to be counted among the advantages of the present invention. This has been found to facilitate the purification of the crude extracts whereby they are freed from contaminants dissolved therein, and to facilitate the recovery of phosphoric acid from the solvent. The first of these two operations, herein termed scrubbing, can be effected with the use of water or pure phosphoric acid being in equilibrium with the organic solution based on its solubility therein. Either of the two scrubbing liquids may suitably be used in a proportion which enables approximately 10 % of the $P_2O_5$ in the extract to be carried along in the scrubbed raffinate. The scrubbing liquids should generally be used in a proportion approximately equal to 1/20–1/50 of the quantity of extract. The extract may advantageously be extracted in a countercurrent operation. Depending on the number of scrubbing stages, material of various degrees of purity can be obtained. With 6 to 8 theoretical stages, it is possible to obtain an organic solution which can hardly be found to contain any contaminants. To this end, it has proved advantageous to use mixers provided with separators or rotary disc columns.

The re-extraction step should preferably be effected as a countercurrent operation in a manner analogous to the scrubbing of the crude extract. The number of steps which are required, and the necessary minimum quantity of water which is to be used, depend on the concentration of phosphoric acid in the extract and on the desired degree of re-extraction. For example, if the extract initially contains 15 weight % of $P_2O_5$ and it is desirable for the $P_2O_5$ concentration to be lowered to less than 0.1 weight %, it is advantageous for the extract and water to be used in a ratio by volume approximately equal to 6.2 : 1. For 8 theoretical countercurrent stages, it is possible to produce phosphoric acid containing 35.5 % of $P_2O_5$. In those cases in which the extract contains $P_2O_5$ in a higher concentration, the resulting pure acid naturally also contains more $P_2O_5$, in accordance with the equilibrium relations which are represented in the phase diagram.

A further preferred feature of the present process comprises neutralizing the purified extracts with one or more alkalies or ammonia. The re-extraction can be achieved in a simple container by directly stirring the components together. By supplying metered quantities of neutralizing agent, it is possible, after separation of the resulting two phases from one another, to obtain a phosphate solution which can be transformed directly into (for example) phosphates for use in detergent compositions.

The solvent so treated, which is substantially free from phosphoric acid, can then be dehydrated in simple distillation equipment. In view of the fact that it is possible, for example, for a $C_5$ alcohol mixture originating from an OXO reaction to absorb up to 8 weight % of water at normal temperature, and in view of the fact that the alcohol and water produce an azeotrope containing substantially equal proportions of the two components, it is only necessary to subject as little as approximately 16 weight % of the total solvent to distillation in order to remove the water therefrom.

The distillation may advantageously be effected under vacuum, making it unnecessary to use temperatures higher than 100°C. Under these conditions, the formation of esters or other undesirable secondary products is substantially avoided. Water which originates from the dehydration of the solvent and from the concentration (if any) of the pure acid, and the raffinate produced in the scrubbing, are recirculated, whereby the loss of solvent is kept to a low proportion; generally it is at most equal to 5 kg of solvent per metric ton of pure $P_2O_5$.

The following Examples illustrate the invention.

EXAMPLE 1

Crude phosphoric acid was prepared by subjecting Moroccan phosphate to a wet-processing treatment with sulfuric acid. After separation of the calcium sulfate, the acid was found to contain 28.96 % of $P_2O_5$ and the following impurities in ppm (parts per million), based on % $P_2O_5$:

| Fe | 5700 | Mn | 80 |
|---|---|---|---|
| Al | 5700 | As | 15 |
| Ca | 1700 | $SiO_2$ | 1500 |
| Mg | 6000 | $SO_4$ | 83000 |
| V | 610 | F | 2300 |

25 kg/hr of acid and 3 kg of recycled scrubbing raffinate were treated, at temperatures between 20° and 30°C, in a system comprising two mixers with settling tanks, with 158 kg/hr of anhydrous amyl alcohol originating from an OXO reaction. 184 kg/hr of an alcoholic phosphoric acid solution and 2 kg of an almost solid raffinate were obtained. The raffinate, which contained 3.2 weight % of $P_2O_5$, based on the $P_2O_5$ used, was decanted and discarded. The alcoholic phosphoric acid solution saturated with water was scrubbed in a countercurrent operation, in a system comprising six mixers provided with settling tanks, by means of 2.8 kg/hr of circulated purified phosphoric acid containing 23.4 weight % of $P_2O_5$. The resulting scrubbing raffinate was combined with crude acid and the whole was treated once again with the alcohol. The purified alcoholic phosphoric acid solution was contacted, in a system comprising eight mixers provided with settling tanks, with 19 kg/hr of water. 30 kg/hr of purified phosphoric acid containing 23.4 weight % of $P_2O_5$ was thus obtained, together with 171 kg/hr of alcohol saturated with water. The alcohol, which contained less than 0.1 % of phosphoric acid, was dehydrated by distilling it under a pressure of 100 mm of mercury. 13 kg/hr of water containing approximately 1 % of residual alcohol was obtained. It was recycled and used for the re-extraction of phosphoric acid from the alcoholic phosphoric acid solution. The phosphoric acid was analyzed and found to contain the following impurities in ppm based on % $P_2O_5$:

| Fe | <30 | Mn | 2 | $SiO_2$ | <100 |
|---|---|---|---|---|---|
| Al | <50 | As | 1 | F | <100 |
| Ca | <20 | | | $SO_4$ | <500 |
| Mg | <20 | | | | |
| V | 5 | | | | |

EXAMPLE 2

Phosphoric acid containing 49.65 weight % of $P_2O_5$ was prepared by subjecting Kola phosphate to a wet-processing treatment with sulfuric acid. The acid contained the following contaminants in ppm, based on % $P_2O_5$:

| Fe | 6800 | V | 663 |
|---|---|---|---|
| Al | 8500 | Mn | 708 |
| Ca | 1300 | $SiO_2$ | 800 |
| Mg | 1000 | F | 2300 |
| Ti | 1100 | $SO_4$ | 72000 |

14.4 kg/hr of the acid and 2.5 kg/hr of a recycled scrubbing raffinate were subjected to a countercurrent treatment, in a system comprising two mixers provided with settling tanks, with 35.8 kg/hr of a dehydrated amyl alcohol mixture originating from an OXO reaction. 1.7 kg/hr of a raffinate and 51.0 kg/hr of a crude extract, which were separated from one another by decantation, were obtained. The crude extract was scrubbed in a countercurrent operation, in a rotary disc column comprising 8 theoretical stages, with 2.3 kg/hr of phosphoric acid containing 35.5 weight % of $P_2O_5$. The resulting scrubbing raffinate, which contained the residual contaminants, was combined with the crude acid to be worked up. The purified extract was treated in a countercurrent operation, in a rotary disc column comprising approximately 8 theoretical trays, with 9.8 kg/hr of water. 19.3 kg/hr of pure phosphoric acid containing 35.5 weight % of $P_2O_5$ and 38.8 kg/hr of alcohol saturated with water were obtained. The dehydration of the alcohol gave 3.0 kg/hr of water containing approximately 1 weight % of alcohol, which was recycled for the re-extraction of phosphoric acid. The pure acid was steam-treated to recover solvent fractions which adhered thereto. Purified $P_2O_5$ was obtained in a yield of 96 weight %. The purified acid was analyzed and found to contain the following impurities: in ppm, based on % $P_2O_5$:

| Fe | <30 | Mn | < 1 |
|----|-----|-----|------|
| Al | <50 | As | < 1 |
| Ca | <50 | $SiO_2$ | <100 |
| Mg | <10 | F | <200 |
| V | 3 | $SO_4$ | <500 |

We claim:

1. In a process for the purification of contaminated wet-processed phosphoric acid, wherein the wet-processed phosphoric acid is mixed in a mixing zone with at least one organic solvent in which water is partially soluble and which dissolves phosphoric acid, the organic phosphoric acid solution obtained is separated from a remaining residue, the dissolved phosphoric acid is recovered from the said organic phosphoric acid solution and the organic solvent freed from phosphoric acid is recycled, the improvement which comprises mixing in the mixing zone aqueous wet-processed phosphoric acid having free phosphoric acid and free water therein with the organic solvent, said organic solvent having a region completely miscible of the three components water, phosphoric acid and organic solvent which lies between the phosphoric acid - organic solvent axis and the binodal curve in a ternary diagram of said three components, said organic solvent being anhydrous and used in a quantity of at least that necessary to dissolve (a) the free phosphoric acid and (b) the free water, with the resultant formation of a single liquid phase and recovering the free phosphoric acid from the said organic phosphoric acid solution by extraction with water in an extraction zone; removing the water from the organic solvent and recycling the resulting anhydrous organic solvent to the mixing zone.

2. The process as claimed in claim 1 wherein the water removed from the organic solvent is recycled to the extraction zone for recovering the dissolved phosphoric acid from the organic phosphoric acid solution.

3. The process as claimed in claim 1 wherein the solvent necessary to dissolve the free phosphoric acid and the free water is used in a quantity of 110 – 115 weight % based on the quantity theoretically needed.

4. The process as claimed in claim 1 wherein the wet-processed phosphoric acid is mixed at most twice with the anhydrous organic solvent.

5. The process as claimed in claim 1, wherein a mineral acid is added to the mixture comprised of organic solvent and wet-processed phosphoric acid.

6. The process as claimed in claim 5, wherein the mineral acid is sulfuric acid, nitric acid or hydrochloric acid.

7. The process as claimed in claim 5, wherein the amount of mineral acid is up to 40 parts by weight, per 100 parts by weight of $P_2O_5$ contained in the wet-processed phosphoric acid.

8. The process as claimed in claim 7, wherein the amount of mineral acid is between 5 and 15 parts by weight, per 100 parts by weight of $P_2O_5$ contained in the wet-processed phosphoric acid.

9. The process as claimed in claim 1, wherein the organic solvent is a $C_5$ alcohol.

10. The process as claimed in claim 9, wherein the $C_5$-alcohol is a $C_5$-alcohol mixture obtained by OXO reaction.

11. The process as claimed in claim 1, wherein the purification is effected at temperatures between 0° and 130°C.

12. The process as claimed in claim 11, wherein the purification is effected at temperatures between 20° and 80°C.

13. The process as claimed in claim 1, wherein the organic phosphoric acid solution separated is scrubbed with water or a phosphoric acid.

14. The process as claimed in claim 13, wherein the organic phosphoric acid solution separated is scrubbed with water or a phosphoric acid in a ratio by volume of 10–100:1.

15. The process as claimed in claim 13, wherein the organic phosphoric acid solution separated is scrubbed in a counterflow operation.

* * * * *